US006823604B2

(12) United States Patent
Kato

(10) Patent No.: US 6,823,604 B2
(45) Date of Patent: Nov. 30, 2004

(54) METHOD FOR ADJUSTING ASSEMBLY JIG

(75) Inventor: Hiroshi Kato, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/346,088

(22) Filed: Jan. 17, 2003

(65) Prior Publication Data

US 2003/0163928 A1 Sep. 4, 2003

(30) Foreign Application Priority Data

Jan. 18, 2002  (JP) ........................................ 2002-009443

(51) Int. Cl.$^7$ ................................................ G01B 5/20
(52) U.S. Cl. ............................ 33/568; 33/573; 33/549
(58) Field of Search .......................... 33/288, 600, 608, 33/549, 568, 573, 551

(56) References Cited

U.S. PATENT DOCUMENTS

| | | | | |
|---|---|---|---|---|
| 4,593,476 A | * | 6/1986 | Clark et al. .................... | 33/529 |
| 5,107,599 A | * | 4/1992 | Marincic et al. ............... | 33/573 |
| 5,481,811 A | * | 1/1996 | Smith ........................... | 33/573 |
| 5,829,151 A | * | 11/1998 | Collier et al. .................. | 33/573 |
| 6,298,572 B1 | * | 10/2001 | McAuley ...................... | 33/573 |

* cited by examiner

Primary Examiner—Christopher W. Fulton
(74) Attorney, Agent, or Firm—Birch, Stewart, Kolasch & Birch, LLP

(57) ABSTRACT

An assembly jig includes a jig frame, workpiece supports provided in the jig frame for supporting a workpiece, and actuators for moving the workpiece supports relative to the jig frame. Based on the results obtained by measuring the positions of reference points of the jig frame and the positions of the workpiece supports by means of a position measurement device, positional coordinates of the workpiece supports relative to a coordinate system fixed to the jig frame are calculated, and the actuators are operated so as to make the deviation of the calculated positional coordinates from the preset positional coordinates a predetermined value or less, thereby automatically correcting the misalignment of the workpiece supports relative to the jig frame. Thus, it is possible to easily and accurately correct the deteriorated precision of an assembly jig caused by the influence of aging and thermal expansion.

12 Claims, 4 Drawing Sheets

METHOD FOR ADJUSTING ASSEMBLY JIG

BACKGROUND OF THE INVENTION

The present application claims priority under 35 U.S.C. 119 of Japanese Patent Application No. 2002-9443 filed on Jan. 18, 2002, the entire contents thereof being hereby incorporated by reference.

CROSS-REFERENCE TO RELATED APPLICATIONS

1. Field of the Invention

The present invention relates to a method for adjusting an assembly jig that includes a jig frame, a workpiece support provided in the jig frame for supporting a workpiece, and an actuator for moving the workpiece support relative to the jig frame.

2. Description of Background Art

In order to indicate the positions of rivet holes, bend lines, trim lines, etc. on a workpiece such as a skin panel of an aircraft, it is necessary for the workpiece to be positioned accurately and mounted rigidly on an assembly jig. The assembly jig is designed so that the workpiece is supported by a plurality of workpiece supports provided in a jig frame, but since the workpiece supports have a rigidity lower than the jig frame having a high rigidity, the positional relationship of the workpiece supports relative to the jig frame is slightly misaligned due to the influence of aging and changes in temperature. As a result, the positional relationship of the workpiece relative to the jig frame is also slightly misaligned.

The thus-caused misalignment is conventionally corrected by periodically measuring the positional relationship of the workpiece supports relative to the jig frame and placing a shim or a spacer on a part where the workpiece supports are fixed to the jig frame.

SUMMARY AND OBJECT OF THE INVENTION

When the positions of the workpiece supports relative to the jig frame are adjusted using a shim or a spacer, the operation is complicated, and not only does it require much time and labor, but there is also a limit to the precision of the adjustment, which is a problem.

The present invention has been carried out in view of such circumstances, and it is an object thereof to easily and accurately correct the deteriorated precision of an assembly jig caused by the influence of aging and thermal expansion.

In order to achieve the object of the invention, in accordance with the present invention, there is proposed a method for adjusting an assembly jig comprising a jig frame, a workpiece support provided in the jig frame for supporting a workpiece, and an actuator for moving the workpiece support relative to the jig frame, the method comprising: operating a position measurement device to determine the coordinates of fixed reference points of the jig frame; establishing preset coordinates of a measurement reference point of the workpiece support relative to the fixed reference points; operating the position measurement device to determine the measured coordinates of the measurement reference point relative to the fixed reference points; determining the deviation of the measured coordinates of the measurement reference point from the preset coordinates of the measurement reference point; and operating the actuator, as needed, to adjust the position of the workpiece support so that the deviation of the measured coordinates of the measurement reference point from the preset coordinates of the measurement reference point is no greater than a predetermined value.

With this method, the positional coordinates of the measurement reference point of the workpiece support relative to the coordinate system fixed to the jig frame are preset; the positions of the coordinate reference points of the jig frame and the position of the measurement reference point of the workpiece support are then measured by means of the position measurement device; the positional coordinates of the measurement reference point of the workpiece support relative to the coordinate system fixed to the jig frame are then calculated based on the measurement results obtained by the position measurement device; the deviation of the calculated positional coordinates from the preset positional coordinates of the workpiece support is calculated; and the actuator is operated so as to make the deviation the predetermined value or less. Therefore, even when the position of the workpiece support relative to the jig frame is misaligned due to aging or changes in temperature, the misalignment can be automatically corrected so as to make the positional coordinates of the measurement reference point of the workpiece support closer to the preset positional coordinates. As a result, it is unnecessary to carry out a complicated adjustment operation using a shim or a spacer each time the misalignment of the workpiece support occurs, and moreover the accuracy of the adjustment can be greatly enhanced in comparison with a manual operation.

The object of the invention is also realized by a method for adjusting an assembly jig comprising a jig frame, a plurality of workpiece supports provided in the jig frame for supporting a workpiece, and a separate actuator for moving each workpiece support relative to the jig frame, the method comprising: operating a position measurement device to determine the coordinates of fixed reference points of the jig frame; establishing preset coordinates of a measurement reference point of each workpiece support relative to the fixed reference points; operating the position measurement device to determine the measured coordinates of each measurement reference point relative to the fixed reference points; determining the deviation of the measured coordinates of each measurement reference point from the preset coordinates of the measurement reference point; and operating the actuator, as needed, to adjust the position of each workpiece support so that the deviation of the measured coordinates of each measurement reference point from the preset coordinates of the measurement reference point is no greater than a predetermined value.

The object of the invention is also realized by a system for positioning a workpiece, the system comprising: a jig frame; a workpiece support provided in the jig frame for supporting a workpiece; an actuator for moving the workpiece support relative to the jig frame; a position measurement device for determining (1) the coordinates of fixed reference points of the jig frame and (2) the measured coordinates of a measurement reference point of the workpiece support relative to the fixed reference points; means for establishing preset coordinates of the measurement reference point relative to the fixed reference points; means for determining the deviation of the measured coordinates of the measurement reference point from the preset coordinates of the measurement reference point; and means for operating the actuator, as needed, to adjust the position of the workpiece support so that the deviation of the measured coordinates of the measurement reference point from the preset coordinates of the measurement reference point is no greater than a predetermined value.

In an embodiment of the invention, tooling balls are used to mark the coordinate reference points of the jig frame, and a tooling ball is used to mark the measurement reference point of the workpiece support.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
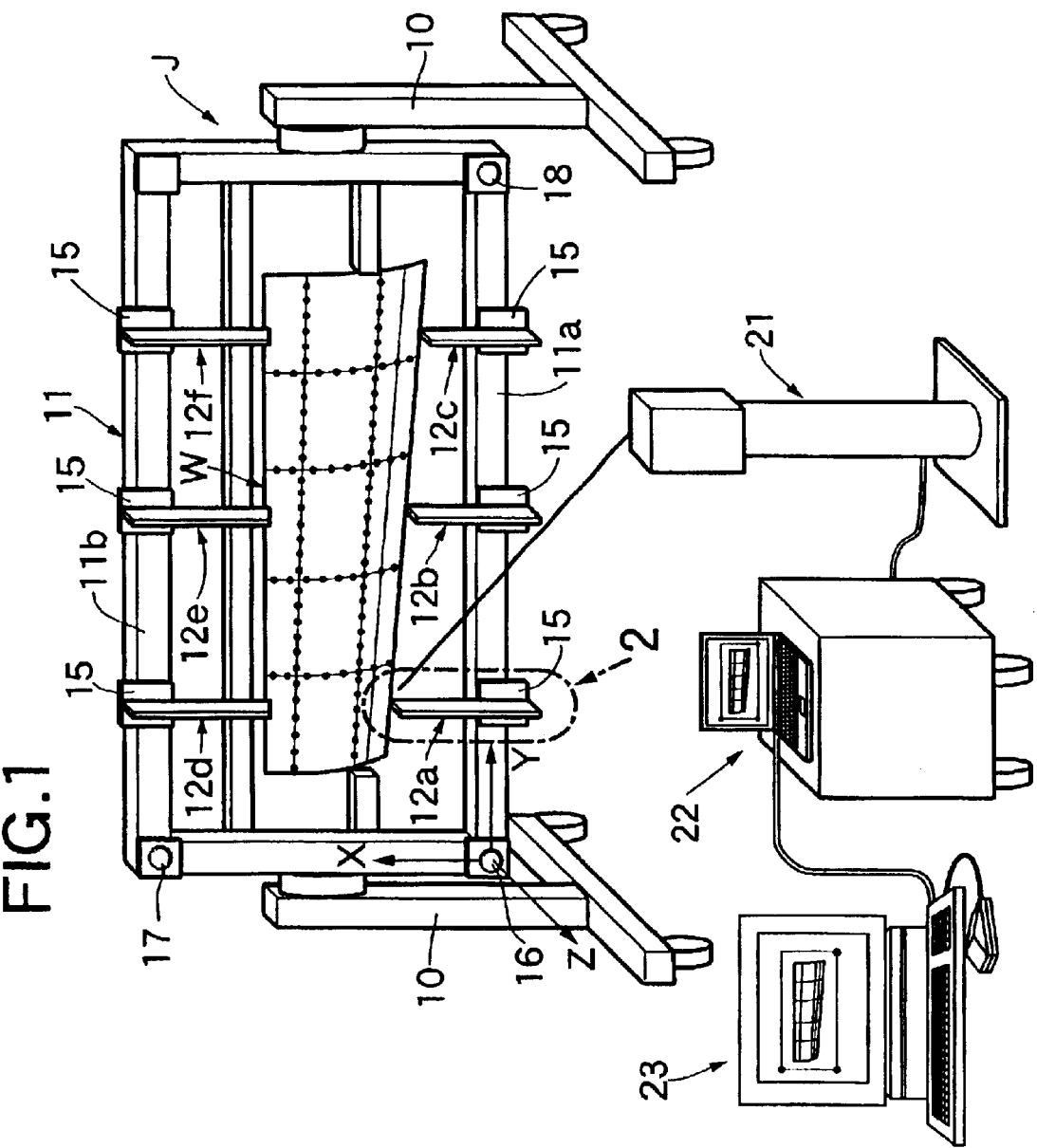
FIG. 1 is a view of the entirety of an assembly jig and an adjustment system for the assembling jig.
Figure 2:
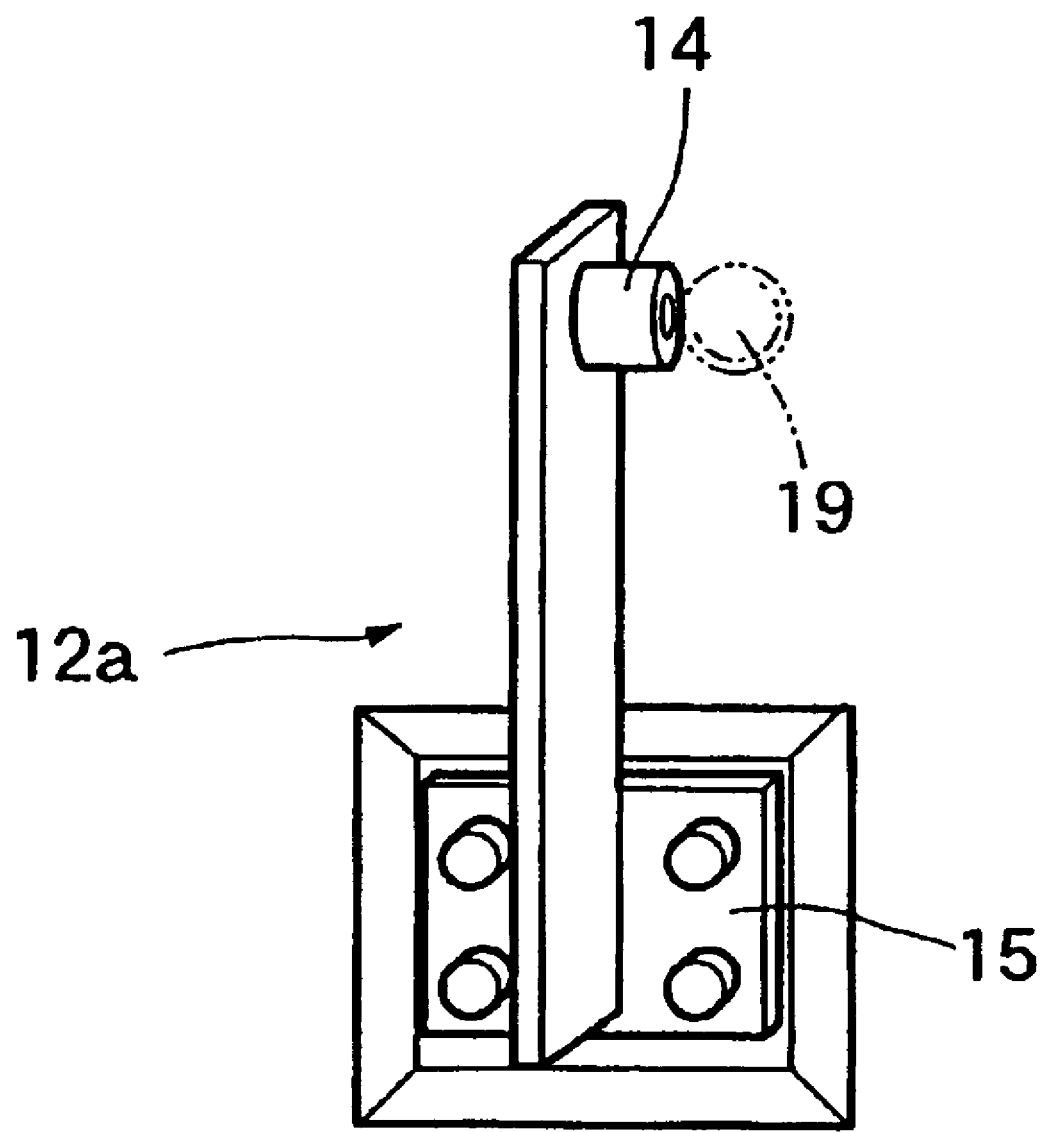
FIG. 2 is a magnified view of a workpiece support as viewed in section 2 of FIG. 1.

As shown in FIGS. 1 and 2, an assembly jig J of this embodiment includes left and right support legs 10, a rectangular jig frame 11 disposed rigidly between the support legs 10, three workpiece supports 12a to 12c extending upward from a lower beam 11a of the jig frame 11, and three workpiece supports 12d to 12f extending downward from an upper beam 11b of the jig frame 11. Each of the workpiece supports 12a to 12f has a clamp 14 provided on the extremity thereof. The clamps 14 support a workpiece W, which is, for example, a skin panel of an aircraft. The base of each of the workpiece supports 12a to 12f is supported on the lower beam 11a or the upper beam 11b via an actuator 15. The actuators 15 are electrically operated and can finely adjust the positions of the workpiece supports 12a to 12f relative to the lower or upper beam 11a or 11b in three directions that are orthogonal to each other.

Provided in the lower left, upper left, and lower right corners of the jig frame 11 of the assembly jig J are tooling balls 16, 17, 18, each of which is used as a coordinate reference point. When adjusting the assembly jig J, a tooling ball 19 is mounted on the clamp 14 of each of the workpiece supports 12a to 12f, the tooling ball 19 being used as a measurement reference point.

The adjustment system for the assembly jig J includes a position measurement device 21, which is a laser device, and a personal computer 22 for controlling the operation of the actuators 15, the personal computer 22 being connected to a 3-D CAD machine 23. The 3-D CAD machine 23 stores the positional coordinates (X, Y, Z) of the tooling balls 19 at the extremities of the six workpiece supports 12a to 12f with regard to the three-dimensional orthogonal coordinate system fixed to the assembly jig J, that is, the three-dimensional orthogonal coordinate system where the lower left tooling ball 16 is its point of origin, its X axis extends in the direction toward the upper left tooling ball 17, its Y axis extends in the direction toward the lower right tooling ball 18, and its Z axis is orthogonal to both the X axis and the Y axis. These positional coordinates (X, Y, Z) can be calculated from the known shape of the workpiece W and the known relationship of the positions where the workpiece W is fixed to the jig frame 11 of the assembly jig J.

A procedure for carrying out an initial adjustment, when the assembly jig J is initially set up, is now explained by reference to the flowchart in FIG. 3.

First, the positional coordinates (X, Y, Z) of the six tooling balls 19 relative to the three-dimensional orthogonal coordinate system fixed to the assembly jig J are set by the 3-D CAD machine 23 (step S1), and data of these positional coordinates (X, Y, Z) are then converted into IGES (Initial Graphics Exchange Specification) format (step S2). The IGES conversion involves data conversion between the positional coordinate data of the 3-D CAD machine 23 and the personal computer 22. The assembly jig J is then provisionally assembled (step S3). In this provisionally assembled state, since adjustment of the assembly jig J is not yet completed, the positions of the six tooling balls 19 relative to the three-dimensional orthogonal coordinate system fixed to the assembly jig J contain errors.

Subsequently, the data converted to IGES format obtained above (data relating to the positional coordinates (X, Y, Z) of the six tooling balls 19) are input into the personal computer 22 from the 3-D CAD machine 23 (step S4), and the position measurement device 21 which is a laser device, then measures the positions of the three tooling balls 16, 17, 18 of the jig frame 11 and the positions of the six tooling balls 19 provided on the six workpiece supports 12a to 12f (step S5).

The personal computer 22 next calculates the positional coordinates (X', Y', Z') of the six tooling balls 19 relative to the three-dimensional orthogonal coordinate system using the positions of the three tooling balls 16, 17, 18 and the positions of the six tooling balls 19 (step S6), and then calculates the deviations (X'–X, Y'–Y, Z'–Z) of the measured positional coordinates (X', Y', Z') of the six tooling balls 19 from the preset positional coordinates (X, Y, Z) of the six tooling balls 19 (step S7). Following this, the positions of the workpiece supports 12a to 12f (that is, the positions of the tooling balls 19) are adjusted so that the X-axis deviation X'–X, the Y-axis deviation Y'–Y, and the Z-axis deviation Z'–Z are all within predetermined values. In general, the initial adjustment requires a large amount of adjustment and therefore employs a shim or a spacer, but when the amount of adjustment is small, it can be carried out by operating the actuators 15.

Figure 4:
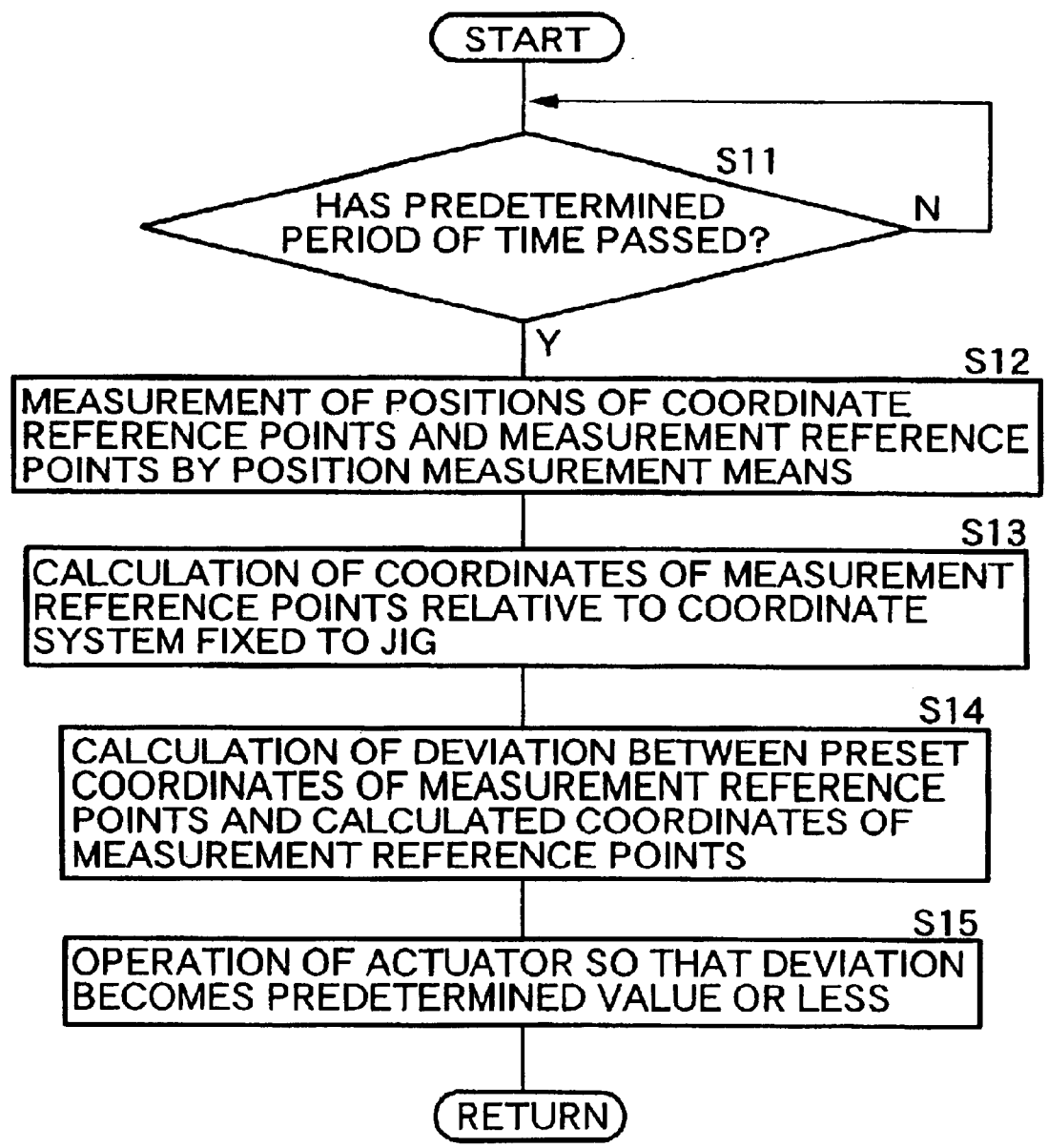
FIG. 4 is a flowchart for disclosing the action of a regular adjustment of the assembly jig.

After the initial adjustment of the assembly jig J is completed as described above, regular adjustment of the assembly jig J is carried out by the procedure shown in FIG. 4.

Figure 3:
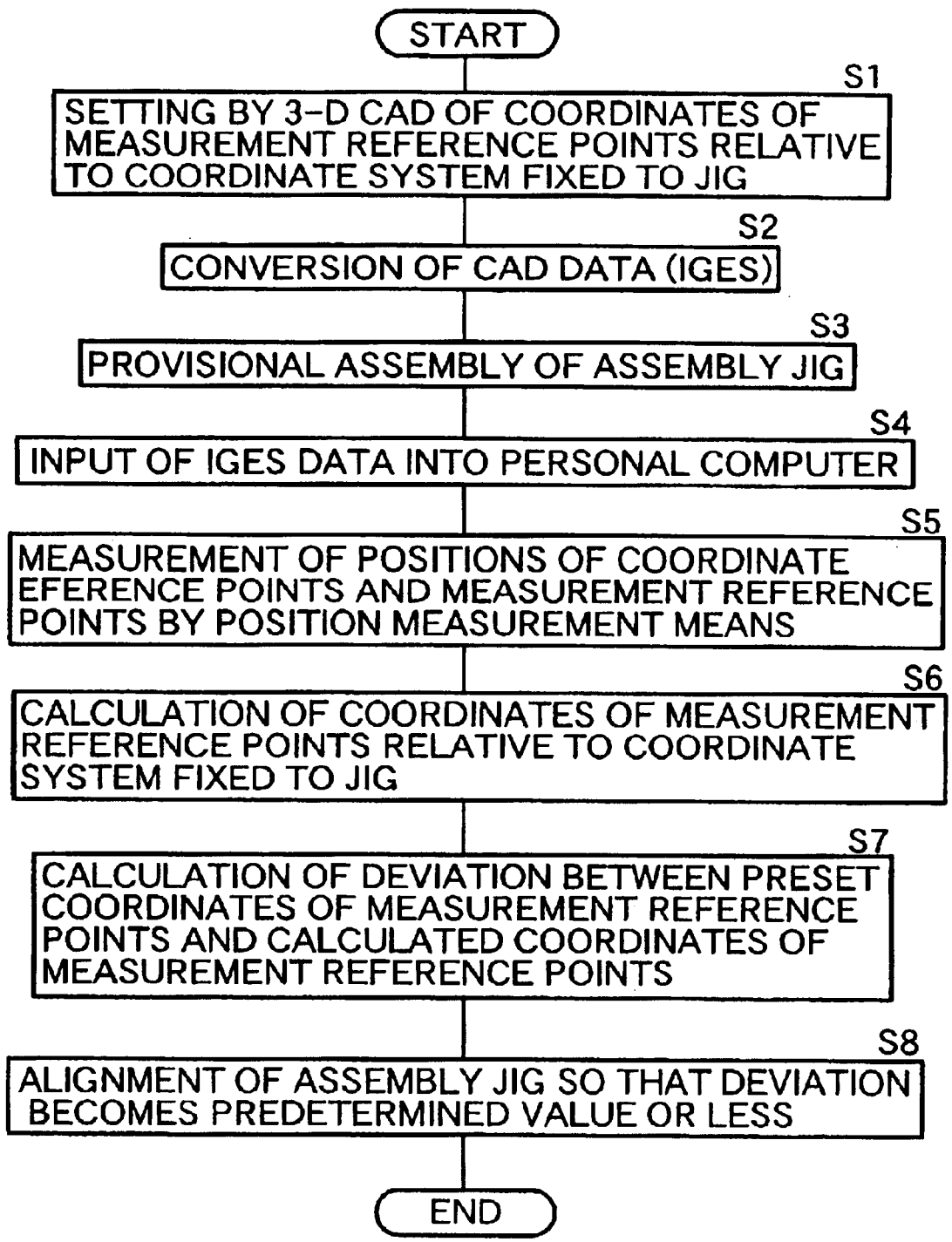
FIG. 3 is a flowchart for disclosing the action of an initial adjustment of the assembly jig.

After a predetermined time for carrying out a periodic adjustment of the assembly jig J has passed (step S11), the procedures of steps S5 to S7 in the flowchart shown in FIG. 3 are carried out. That is, the position measurement device 21 measures the positions of the three tooling balls 16, 17, 18 of the jig frame 11 and the positions of the six tooling balls 19 provided on the six workpiece supports 12a to 12f (step S12); the positional coordinates (X', Y', Z') of the six tooling balls 19 relative to the three-dimensional orthogonal coordinate system are calculated using the positions of the three tooling balls 16, 17, 18 and the positions of the six tooling balls 19 (step S13); and the deviations (X'–X, Y'–Y, Z'–Z) of the measured positional coordinates (X', Y', Z') of the six tooling balls 19 from the preset positional coordinates (X, Y, Z) of the six tooling balls 19 are calculated (step S14). The positions of the workpiece supports 12a to 12f (that is, the positions of the tooling balls 19) are then adjusted by operating the actuators 15 so that the X-axis deviation X'–X, the Y-axis deviation Y'–Y, and the Z-axis deviation Z'–Z are all within the predetermined values (step S15).

As described above, based on the results obtained by the position measurement device 21 for the positions of the three tooling balls 16, 17, 18 of the jig frame 11 and the positions of the six tooling balls 19 of the workpiece supports 12a to 12f, the positional coordinates of the tooling balls 19 of the workpiece supports 12a to 12f relative to the three-dimensional orthogonal coordinate system fixed to the jig frame 11 are calculated, the actuators 15 are operated so that the deviations of the calculated positional coordinates (X', Y', Z') of the six tooling balls 19 of the workpiece supports 12a to 12f from the preset positional coordinates (X, Y, Z) of the six tooling balls 19 are within the predetermined values, whereby the misalignment of the workpiece supports 12a to 12f relative to the jig frame 11 can be automatically corrected.

Furthermore, since manual adjustment is carried out only once in the initial adjustment of the assembly jig J, and the subsequent regular adjustment is automatically carried out, not only is it unnecessary to carry out a complicated adjustment operation using a shim or a spacer each time misalignment occurs in the workpiece supports 12a to 12f, but also the precision of the adjustment can be greatly enhanced.

As described above, in accordance with the first aspect of the present invention, the positional coordinates of the measurement reference point of the workpiece support relative to the coordinate system fixed to the jig frame are preset; the positions of the coordinate reference points of the jig frame and the position of the measurement reference point of the workpiece support are then measured by means of the position measurement device; the positional coordinates of the measurement reference point of the workpiece support relative to the coordinate system fixed to the jig frame are then calculated based on the measurement results obtained by the position measurement device; the deviation of the calculated positional coordinates from the preset positional coordinates of the workpiece support is calculated; and the actuator is operated so as to make the deviation the predetermined value or less. Therefore, even when the position of the workpiece support relative to the jig frame is misaligned due to aging or changes in temperature, the misalignment can be automatically corrected so as to make the positional coordinates of the measurement reference point of the workpiece support closer to the preset positional coordinates. As a result, it is unnecessary to carry out a complicated adjustment operation using a shim or a spacer each time the misalignment of the workpiece support occurs, and moreover the accuracy of the adjustment can be greatly enhanced in comparison with a manual operation.

An embodiment of the present invention is explained in detail above, but the present invention can be modified in a variety of ways without departing from the spirit and scope of the present invention.

For example, the present invention is not limited to a skin panel of an aircraft and can be applied to any workpiece W, and the operation for the workpiece W mounted rigidly on the assembly jig J can be chosen freely. Furthermore, the position measurement device 21 is not limited to a laser device.

The invention being thus described, it will be obvious that the same may be varied in many ways. Such variations are not to be regarded as a departure from the spirit and scope of the invention, and all modifications as would be obvious to one skilled in the art are intended to be include within the scope of the following claims.

What is claimed is:

1. A method for adjusting an assembly jig comprising a jig frame, a workpiece support provided in the jig frame for supporting a workpiece, and an actuator for moving the workpiece support relative to the jig frame, the method comprising:
   a) operating a position measurement device to determine the coordinates of fixed reference points of the jig frame;
   b) establishing preset coordinates of a measurement reference point of the workpiece support relative to the fixed reference points;
   c) operating the position measurement device to determine the measured coordinates of the measurement reference point relative to the fixed reference points;
   d) determining the deviation of the measured coordinates of the measurement reference point from the preset coordinates of the measurement reference point; and
   e) operating a computer to control operation of the actuator, as needed, to adjust the position of the workpiece support so that the deviation of the measured coordinates of the measurement reference point from the preset coordinates of the measurement reference point is no greater than a predetermined value, wherein the actuator is electrically operated and is capable of imparting movement to the workpiece support in three mutually orthogonal directions, and wherein steps a) through e) are performed automatically at predetermined intervals.

2. The method as recited in claim 1, wherein, in step a), the coordinates of three fixed reference points of the jig frame are determined.

3. The method as recited in claim 1, wherein the position measurement device comprises a laser measuring device.

4. A method for adjusting an assembly jig comprising a jig frame, a plurality of workpiece supports provided in the jig frame for supporting a workpiece, and a separate actuator for moving each workpiece support relative to the jig frame, the method comprising:
   a) operating a position measurement device to determine the coordinates of fixed reference points of the jig frame;
   b) establishing preset coordinates of a measurement reference point of each workpiece support relative to the fixed reference points;
   c) operating the position measurement device to determine the measured coordinates of each measurement reference point relative to the fixed reference points;
   d) determining the deviation of the measured coordinates of each measurement reference point from the preset coordinates of the measurement reference point; and
   e) operating a computer to control operation of the actuator, as needed, to adjust the position of each workpiece support so that the deviation of the measured coordinates of each measurement reference point from the preset coordinates of the measurement reference point is no greater than a predetermined value, wherein the actuators are electrically operated and are capable of imparting movement to the workpiece supports in three mutually orthogonal directions, and wherein steps a) through e) are performed automatically at predetermined intervals.

5. The method as recited in claim 4, wherein, in step a), the coordinates of three fixed reference points of the jig frame are determined.

6. The method as recited in claim 4, wherein the position measurement device comprises a laser measuring device.

7. A system for positioning a workpiece, the system comprising:

a jig frame;

a workpiece support provided in the jig frame for supporting a workpiece;

an actuator for moving the workpiece support relative to the jig frame;

a position measurement device for determining (1) the coordinates of fixed reference points of the jig frame and (2) the measured coordinates of a measurement reference point of the workpiece support relative to the fixed reference points;

means for establishing preset coordinates of the measurement reference point relative to the fixed reference points;

means for determining the deviation of the measured coordinates of the measurement reference point from the preset coordinates of the measurement reference point; and a computer for controlling operation of the actuator, as needed, to adjust the position of the workpiece support so that the deviation of the measured coordinates of the measurement reference point from the preset coordinates of the measurement reference point is no greater than a predetermined value, wherein the actuator is electrically operated and is capable of imparting movement to the workpiece support in three mutually orthogonal directions, and wherein adjustments of the of the position of the workpiece support are automatically performed at predetermined intervals, so as to maintain the deviation of the measured coordinates of the measurement reference point from the preset coordinates of the measurement reference point to a value that is no greater than a predetermined value.

8. The system as recited in claim 7, wherein the position measurement device is operable for determining the coordinates of three fixed reference points of the jig frame.

9. The system as recited in claim 7, wherein the position measurement device comprises a laser measuring device.

10. The system as recited in claim 7, wherein:

a plurality of workpiece supports are provided in the jig frame for supporting a workpiece;

a separate actuator is provided for moving each workpiece support relative to the jig frame;

the position measurement device is operable for determining the measured coordinates of a measurement reference point of each workpiece support relative to the fixed reference points;

the means for establishing preset coordinates is operable for establishing the preset coordinates of a measurement reference point of each workpiece relative to the fixed reference points;

the means for determining the deviation is operable for determining, for each workpiece support, the deviation of the measured coordinates of the measurement reference point from the preset coordinates of the measurement reference point; and the computer is operable for controlling the operation of each actuator, as needed, to adjust the position of each workpiece support so that, for each workpiece support, the deviation of the measured coordinates of the measurement reference point from the preset coordinates of the measurement reference point is no greater than a predetermined value.

11. The system as recited in claim 10, wherein the position measurement device is operable for determining the coordinates of three fixed reference points of the jig frame.

12. The system as recited in claim 10, wherein the position measurement device comprises a laser measuring device.

* * * * *